United States Patent
Shin

(10) Patent No.: US 11,442,321 B2
(45) Date of Patent: Sep. 13, 2022

(54) DISPLAY PANEL AND METHOD OF FABRICATING THE SAME

(71) Applicant: Samsung Display Co., Ltd., Yongin-Si (KR)

(72) Inventor: Dong Hee Shin, Asan-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 17/021,980

(22) Filed: Sep. 15, 2020

(65) Prior Publication Data

US 2021/0215985 A1    Jul. 15, 2021

(30) Foreign Application Priority Data

Jan. 10, 2020    (KR) .................. 10-2020-0003424

(51) Int. Cl.
*G02F 1/1362* (2006.01)
*G02F 1/1368* (2006.01)

(52) U.S. Cl.
CPC ...... *G02F 1/136286* (2013.01); *G02F 1/1368* (2013.01); *G02F 1/136254* (2021.01); *G02F 1/136295* (2021.01); *G02F 2201/121* (2013.01); *G02F 2201/123* (2013.01); *G02F 2202/28* (2013.01)

(58) Field of Classification Search
CPC .............................................. G02F 1/136286
See application file for complete search history.

(56) References Cited

U.S. PATENT DOCUMENTS

| | | | |
|---|---|---|---|
| 7,821,588 B2 | 10/2010 | Chang et al. | |
| 8,216,937 B2 | 7/2012 | Chang et al. | |
| 8,502,275 B2 | 8/2013 | Chang | |
| 9,772,523 B2 | 9/2017 | Lim | |
| 9,818,328 B2 | 11/2017 | Hong et al. | |
| 2010/0159695 A1* | 6/2010 | Chang | H01L 27/0203 438/669 |
| 2012/0153310 A1* | 6/2012 | Kwak | G02F 1/134363 257/E21.531 |
| 2015/0144940 A1* | 5/2015 | Hong | H01L 22/32 438/18 |
| 2017/0199439 A1* | 7/2017 | Jia | G09G 3/006 |

FOREIGN PATENT DOCUMENTS

| | | |
|---|---|---|
| KR | 10-0831235 B1 | 5/2008 |
| KR | 10-1337167 B1 | 12/2013 |
| KR | 10-1349094 B1 | 1/2014 |
| KR | 10-2016-0070266 A | 6/2016 |
| KR | 10-2016-0124981 A | 10/2016 |

* cited by examiner

*Primary Examiner* — Sang V Nguyen
(74) *Attorney, Agent, or Firm* — Innovation Counsel LLP

(57) ABSTRACT

A display panel may include a first display substrate. The first display substrate may include a base layer defining a display area and a non-display area that is adjacent to the display area, a gate line disposed on the base layer, a first insulating layer disposed on the base layer and covering the gate line, and a test line overlapping the non-display area and disposed on the first insulating layer, the test line being in electric contact with the gate line through a first contact hole defined in the first insulating layer.

20 Claims, 14 Drawing Sheets

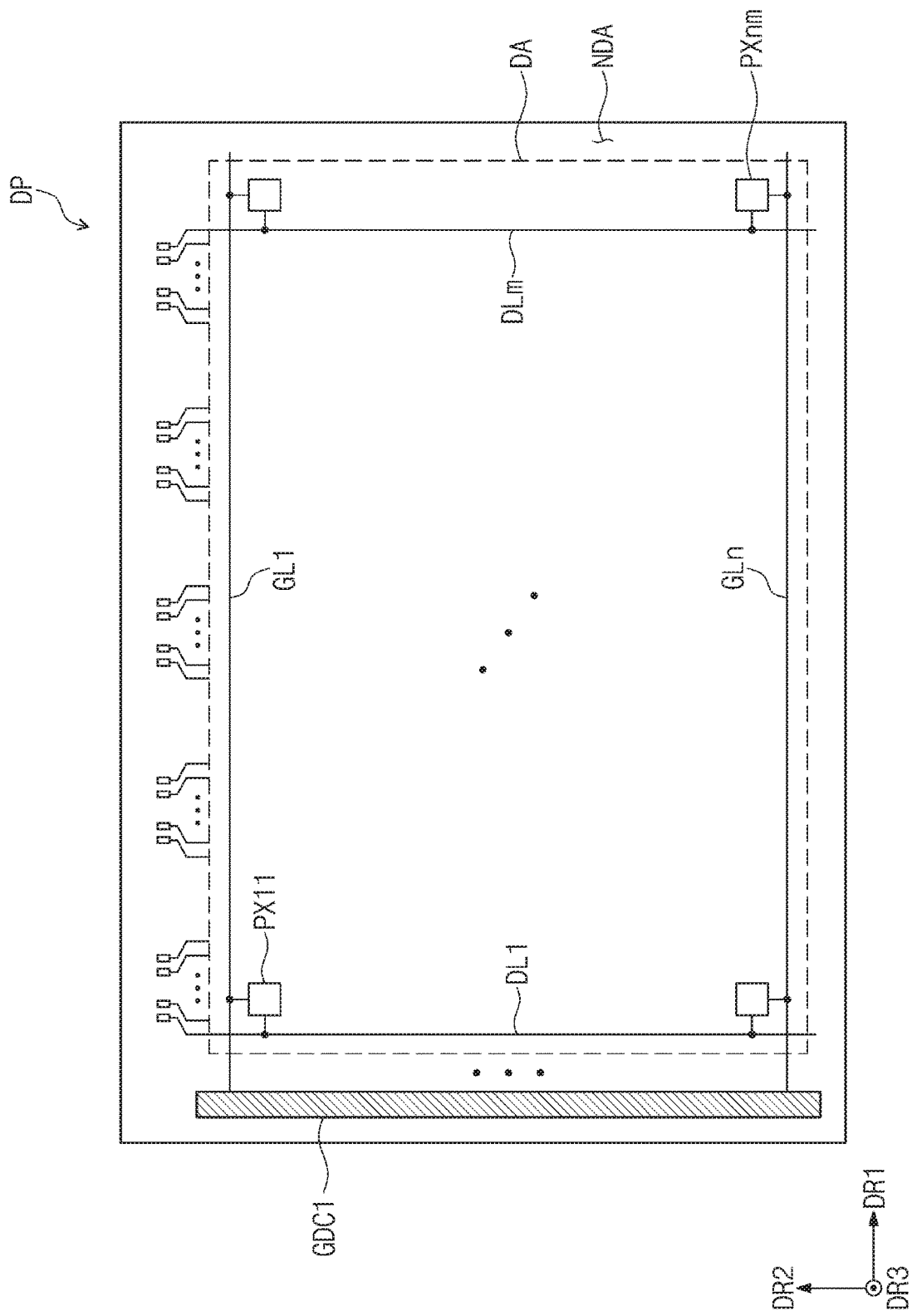

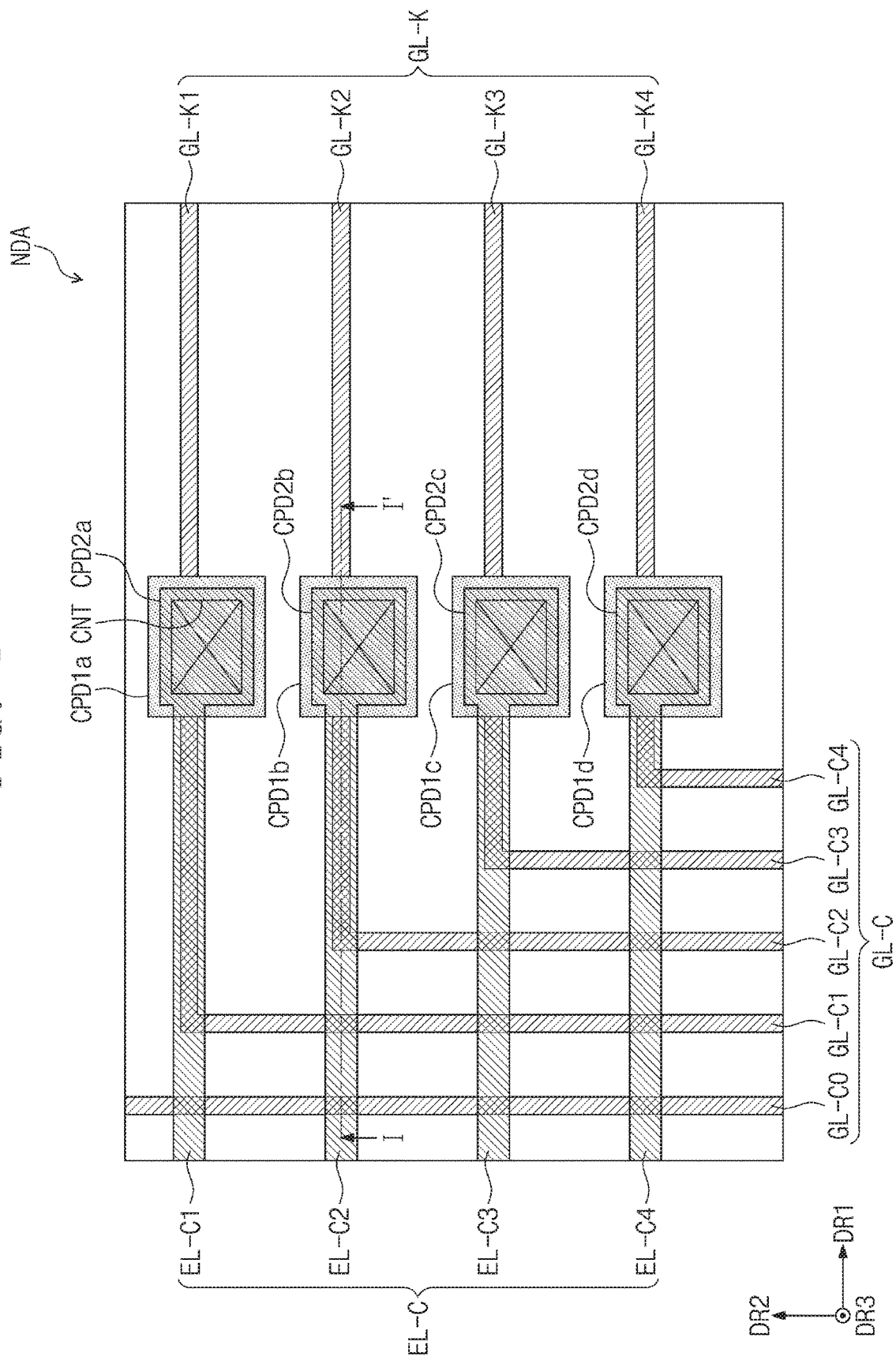

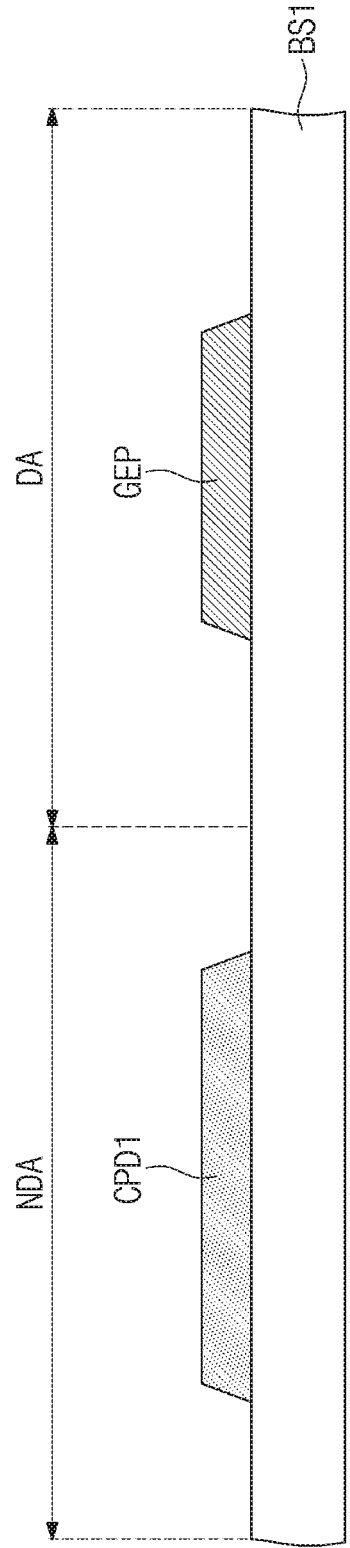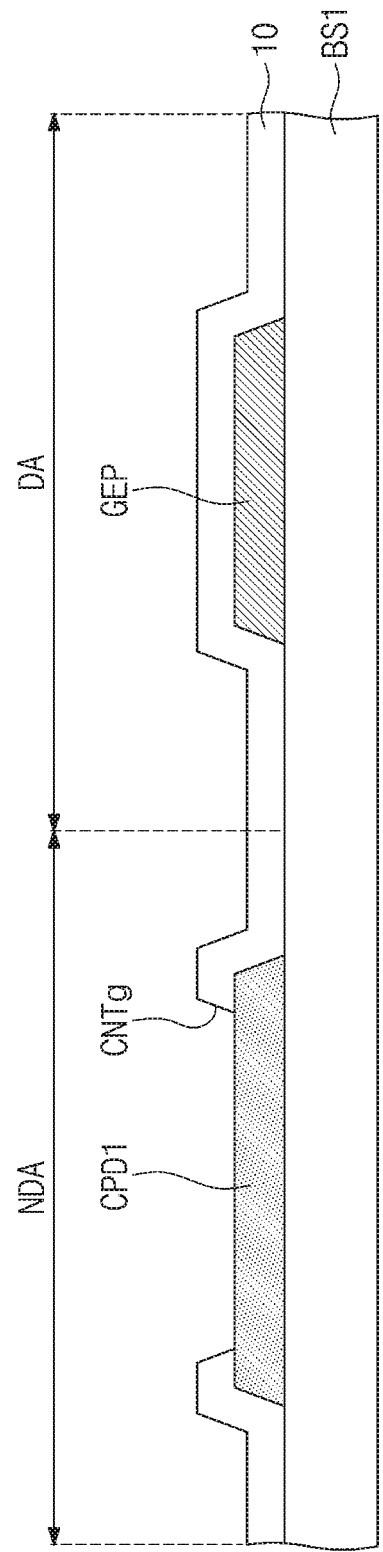

DISPLAY PANEL AND METHOD OF FABRICATING THE SAME

CROSS-REFERENCE TO RELATED APPLICATIONS

This U.S. non-provisional patent application claims priority under 35 U.S.C. § 119 to Korean Patent Application No. 10-2020-0003424, filed on Jan. 10, 2020, in the Korean Intellectual Property Office, the disclosure of which is hereby incorporated by reference in its entirety.

BACKGROUND OF THE INVENTION

The present disclosure relates to a display panel, and in particular, to a display panel and a method of fabricating the same.

There is an increasing demand and requirement for next-generation display devices with low power consumption, excellent portability, and an added value proposition for various applications. In a typical display device, each pixel includes a thin film transistor to control an on/off state of the pixel based on a voltage provided to the pixel.

A typical display device includes a display panel and a light source that provides light to the display panel. The light source may include a light-emitting device and optionally a light-guiding member. In addition, the display panel may include a plurality of signal lines electrically connected to the corresponding pixels. Examples of such signal lines include, but are not limited to, a plurality of data lines and a plurality of gate lines.

Meanwhile, during a fabrication process of the display panel, a test operation may be performed to examine a breakage or connectivity failure in the signal lines. For example, the test operation may be performed on at least one of the signal lines to determine whether a driving signal is properly provided to the corresponding pixel through the signal line.

SUMMARY

An embodiment of the inventive concept provides a display panel that is configured to check the presence or absence of broken signal lines while preventing a breakage of the signal lines during a test process, and a method of fabricating the same.

According to an embodiment of the inventive concept, a display panel may include a first display substrate. The first display substrate may include a base layer defining a display area and a non-display area that is adjacent to the display area, a gate line disposed on the base layer, a first insulating layer disposed on the base layer and covering the gate line, and a test line overlapping the non-display area and disposed on the first insulating layer, the test line being in electric contact with the gate line through a first contact hole defined in the first insulating layer.

In an embodiment, the gate line may include a connection line portion and a line portion, each of which is disposed on the base layer and is extended in a specific direction, and a pad portion that is disposed between the connection line portion and the line portion. The connection line portion and the pad portion may overlap the non-display area, and the line portion may overlap the display area and the non-display area.

In an embodiment, the pad portion may have an area larger than each of the connection line portion and the line portion within a specific area having a same length in the specific direction and in another direction perpendicular to the specific direction.

In an embodiment, the connection line portion, the pad portion, and the line portion may be disposed on the base layer and have a unitary body.

In an embodiment, the test line may include a test line portion and a test pad portion that are electrically connected to each other. The test pad portion may overlap the pad portion and may be in electric contact with the pad portion through the first contact hole.

In an embodiment, the first contact hole may include a plurality of first sub-contact holes spaced apart from each other in a plan view. The test pad portion may be in electric contact with the pad portion through the plurality of first sub-contact holes.

In an embodiment, the first display substrate may further include a second insulating layer disposed on the first insulating layer and covering the test line, and an auxiliary test pad portion disposed on the second insulating layer and being in electric contact with the test pad portion through a second contact hole defined in the second insulating layer.

In an embodiment, the second contact hole may include a plurality of second sub-contact holes spaced apart from each other in a plan view. The auxiliary test pad portion may be in electric contact with the auxiliary test pad portion through the plurality of second sub-contact holes.

In an embodiment, the first display substrate may further include at least one intermediate insulating layer disposed between the first insulating layer and the second insulating layer.

In an embodiment, the display panel may further include a second display substrate facing the first display substrate and a liquid crystal layer that is disposed between the first display substrate and the second display substrate. The first display substrate may further include a pixel electrode that overlaps the display area and is disposed on the second insulating layer through a same process as that for the auxiliary test pad portion.

In an embodiment, one of the first display substrate and the second display substrate may further include a common electrode.

In an embodiment, the test pad portion and the test line portion may be disposed on the first insulating layer and may have a unitary body. The test pad portion may have an area larger than the test line portion within a specific area having a same length in the specific direction and in another direction perpendicular to the specific direction.

In an embodiment, the gate line may be provided as a plurality of gate lines, and the test line may be provided as a plurality of test lines corresponding to the plurality of gate lines, respectively. A first test line among the plurality of the test lines may partially overlap at least one of the plurality of gate lines.

In an embodiment, the first display substrate may further include a thin film transistor that overlaps the display area and is disposed on the base layer. The thin film transistor may include a control electrode disposed on the base layer through a first process that is same as that for the gate line, and a first electrode and a second electrode disposed on the first insulating layer through a second process that is same as that for the test line.

In an embodiment, an end of the test line may be electrically connected to the gate line, and an opposite end of the test line may be grounded.

According to an embodiment of the inventive concept, a method of fabricating of a display panel may include forming a gate line on a first base layer, forming a first insulating layer on the first base layer to cover the gate line, etching a portion of the first insulating layer to form a first contact hole exposing at least a portion of the gate line, forming a test line on the first insulating layer being in electric contact with the gate line through the first contact hole, and coupling a second base layer to the first base layer using an adhesive member.

In an embodiment, the method may further include forming a control electrode on an area of the first base layer that overlaps a display area, through a first process that is same as that for the gate line, and forming a first electrode and a second electrode, that overlap the display area, on the first insulating layer through a second process that is same as that for the test line.

In an embodiment, the method may further include forming a second insulating layer on the first insulating layer to cover the test line, forming a second contact hole and a pixel contact hole in the second insulating layer, the second contact hole overlapping the test pad portion, and the pixel contact hole overlapping the second electrode, and forming an auxiliary test pad portion and a pixel electrode on the second insulating layer. The auxiliary test pad portion may be in electric contact with the test pad portion through the second contact hole, and the pixel electrode may be in electric contact with the second electrode through the pixel contact hole.

In an embodiment, the gate line may include a connection line portion, a pad portion, and a line portion that are sequentially arranged. The test line may include a test line portion and a test pad portion that is in electric contact with the pad portion through the first contact hole. The pad portion may have an area larger than each of the connection line portion and the line portion within a first region occupied by the pad portion, and the test pad portion have an area larger than the test line portion within a second region occupied by the test pad portion.

According to an embodiment of the inventive concept, a display panel may include a base layer defining a display area and a non-display area that is adjacent to the display area, a signal line disposed on the base layer, the signal line including a connection line portion and a line portion, each of which is extended in a specific direction, and a pad portion that is disposed between the connection line portion and the line portion, an insulating layer disposed on the base layer and covering the signal line, and a test line overlapping the non-display area, and being disposed on the insulating layer and in electric contact with the signal line through at least one contact hole defined in the insulating layer. The test line may include a test line portion and a test pad portion that are electrically connected to each other. The test line portion may be extended in the specific direction, and the test pad portion may overlap the pad portion in a plan view.

BRIEF DESCRIPTION OF THE DRAWINGS

Example embodiments of the present disclosure will be more clearly understood from the following brief description taken in conjunction with the accompanying drawings. The accompanying drawings represent non-limiting, example embodiments as described herein.

FIG. 2A is a plan view illustrating a display panel according to an embodiment of the inventive concept.

FIG. 4 is a plan view illustrating a portion of a display panel that overlaps a non-display area, according to an embodiment of the inventive concept.

FIGS. 9A, 9B, 9C, 9D, and 9E are sectional views illustrating a method of fabricating a display panel, according to an embodiment of the inventive concept.

Figure 1A:
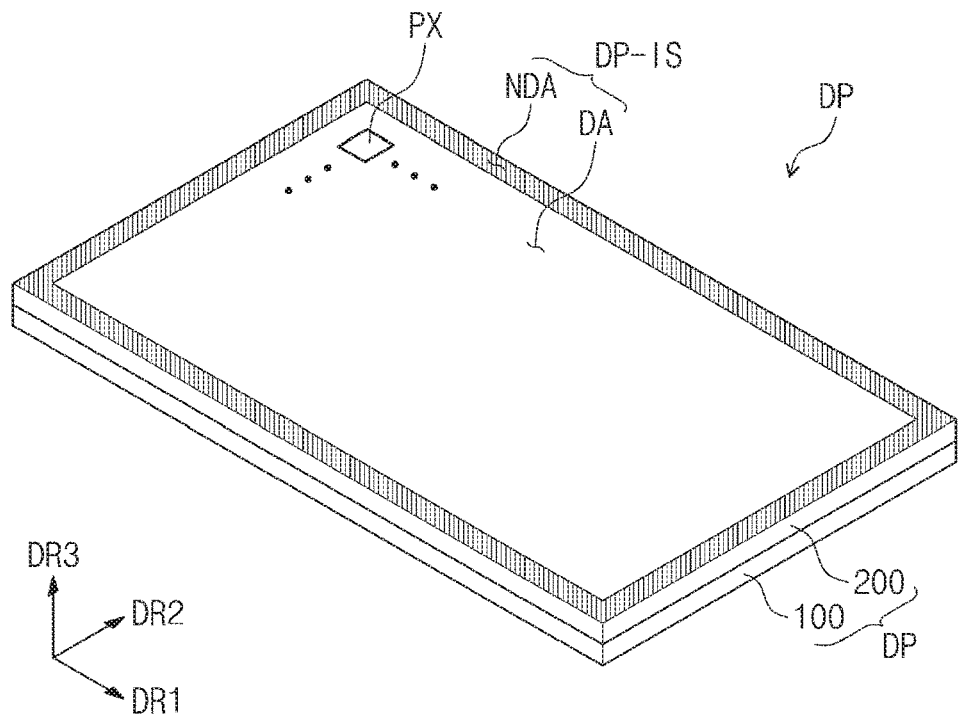
FIG. 1A is a perspective view illustrating a display panel according to an embodiment of the inventive concept.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, areas, and/or structural elements may be reduced or exaggerated for clarity. The use of similar or identical reference numbers in the various drawings is intended to indicate the presence of a similar or identical element or feature.

DETAILED DESCRIPTION

Example embodiments of the inventive concepts will now be described more fully with reference to the accompanying drawings, in which example embodiments are shown. Example embodiments of the inventive concepts may, however, be embodied in many different forms and should not be construed as being limited to the example embodiments set forth herein; rather, these example embodiments are provided so that the present disclosure will be thorough and complete, and will fully convey the concept of the inventive concepts to those of ordinary skill in the art. In the drawings, the thicknesses of layers and areas are exaggerated for clarity. Like reference numerals in the drawings may denote like elements, and their description will be omitted.

It will be understood that when an element is referred to as being "connected" or "coupled" to another element, it can be directly connected or coupled to the other element or one or more intervening elements may be present. In contrast, when an element is referred to as being "directly connected" or "directly coupled" to another element, there are no intervening elements present. Like numbers indicate like elements throughout the present disclosure. As used herein, the term "and/or" includes any and all combinations of one or more of the associated listed items. Other words used to describe a relationship between elements or layers should be interpreted in a like fashion (e.g., "between" versus "directly between," "adjacent" versus "directly adjacent," "on" versus "directly on").

It will be understood that, although the terms "first," "second," etc. may be used herein to describe various elements, components, areas, layers, and/or sections, these elements, components, areas, layers, and/or sections should not be limited by these terms. These terms are only used to distinguish one element, component, area, layer, or section from another element, component, area, layer, or section. Thus, a first element, component, area, layer, or section discussed below could be termed a second element, component, area, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the drawings. It will be understood that the spatially relative terms are intended to encompass different orientations of a device in use or operation in addition to the orientation depicted in the drawings. For example, if the device in the drawings is turned over, elements described as "below" or "beneath" other elements or features would then be oriented "above" or "over" the other elements or features. Thus, it is understood that the exemplary term "below" can encompass both an orientation of above and below. The device may be otherwise oriented (rotated 90 degrees or at other orientations), and the spatially relative descriptors used herein would be interpreted accordingly.

The terminology used herein is for the purpose of describing particular embodiments and is not intended to be limiting of the example embodiments. As used herein, singular forms such as "a," "an," and "the" are intended to include plural forms as well, unless the context clearly indicates otherwise. It will be further understood that the terms "comprises," "comprising," "includes," and/or "including," if used herein, specify the presence of stated features, integers, steps, operations, elements, and/or components, but do not preclude the presence or addition of one or more other features, integers, steps, operations, elements, components, and/or groups thereof.

Example embodiments of the inventive concepts may be described herein with reference to cross-sectional illustrations that are schematic illustrations of idealized embodiments (and intermediate structures) of the example embodiments. As such, variations from the shapes of the illustrations as a result, for example, of manufacturing techniques and/or tolerances, are to be expected. Thus, example embodiments of the inventive concepts should not be construed as limited to the particular shapes of areas illustrated herein but are to include deviations in shapes that result, for example, from manufacturing.

Unless otherwise defined, terms (including technical and scientific terms) used herein have the same meaning as commonly understood by one of ordinary skill in the art to which example embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 1B:
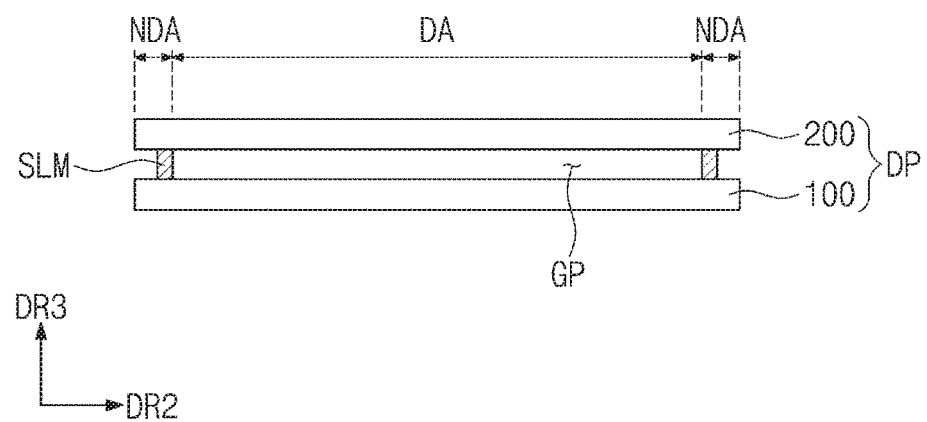
FIG. 1B is a sectional view illustrating a display panel according to an embodiment of the inventive concept.

FIG. 1A is a perspective view illustrating a display panel according to an embodiment of the inventive concept. FIG. 1B is a sectional view illustrating a display panel according to an embodiment of the inventive concept.

A display panel DP according to an embodiment of the inventive concept may be used for large-sized electronic devices (e.g., monitors and outdoor billboards) or small- or medium-sized electronic devices (e.g., personal computers, laptop computers, personal digital assistants, car navigation systems, game machines, smart phones, tablets, and cameras). However, it should be understood that these are merely examples of the inventive concept, and that other electronic devices may be used to realize the inventive concept without departing from the inventive concept.

In an embodiment, the display panel DP may be a liquid crystal display panel, but the inventive concept is not limited thereto. For example, the display panel DP may be a light emitting type display panel and may be provided in the form of an organic light emitting display panel or a quantum dot light-emitting display panel. An emission layer of the organic light emitting display panel may be formed of or include an organic luminescent material. An emission layer of the quantum dot light emitting display panel may include a quantum dot, a quantum rod, or the like.

Hereinafter, an example, in which the display panel DP is a liquid crystal display panel, will be described. Furthermore, depending on the type of the display panel DP, a light source may be provided, although it not explicitly shown in the figures.

Referring to FIG. 1A, the display panel DP may include a first display substrate 100 and a second display substrate 200 that is spaced apart from the first display substrate 100 to face the first display substrate 100. As shown in FIG. 1A, the display panel DP may include a display surface DP-IS that is used to display an image. The display surface DP-IS may be parallel to a surface defined by a first direction DR1 and a second direction DR2.

The display surface DP-IS may include a display area DA and a non-display area NDA. The display area DA may overlap a pixel PX displaying an image, and the non-display area NDA may not overlap the pixel PX. Although not shown, a dummy pixel may be disposed in the non-display area NDA.

The non-display area NDA may be defined along an edge of the display surface DP-IS. As shown in FIG. 1A, the display area DA may be rectangular or tetragonal, and the non-display area NDA may enclose the display area DA. However, the inventive concept is not limited to this example, and the shapes of the display area DA and the non-display area NDA may be variously changed in a mutually influential manner. For example, the non-display area NDA may be locally provided near only one side portion of the display area DA. In another example, the non-display area NDA may be omitted.

A normal direction of the display surface DP-IS (i.e., a thickness direction of the display panel DP) may be referred to as a third direction DR3. In the present specification, the expression "when viewed in a plan view" or "in a plan view" may be used to describe a shape of an object viewed in the third direction DR3. Hereinafter, a front or top surface of each element, layer, or unit will be differentiated from a back or bottom surface thereof based on the third direction DR3. In some embodiments, the first to third directions DR1, DR2, and DR3 may be changed to indicate other (e.g., opposite) directions.

In the embodiment illustrated in FIG. 1A, the display panel DP having the planar display surface DP-IS is illustrated, but the inventive concept is not limited to this example. The display panel DP may include a curved or three-dimensional display surface. The three-dimensional display surface may include a plurality of display areas that are oriented in different directions.

Referring to FIG. 1B, an internal gap GP may be formed between the second display substrate 200 and the first display substrate 100. An adhesive member SLM may be disposed between the second display substrate 200 and the first display substrate 100 overlapping with the non-display area NDA. In an embodiment, the internal gap GP may be formed by the adhesive member SLM coupling the second display substrate 200 and the first display substrate 100. The adhesive member SLM may be formed of or include at least one of organic or inorganic adhesive members. The adhesive member SLM may include a frit.

Figure 2B:
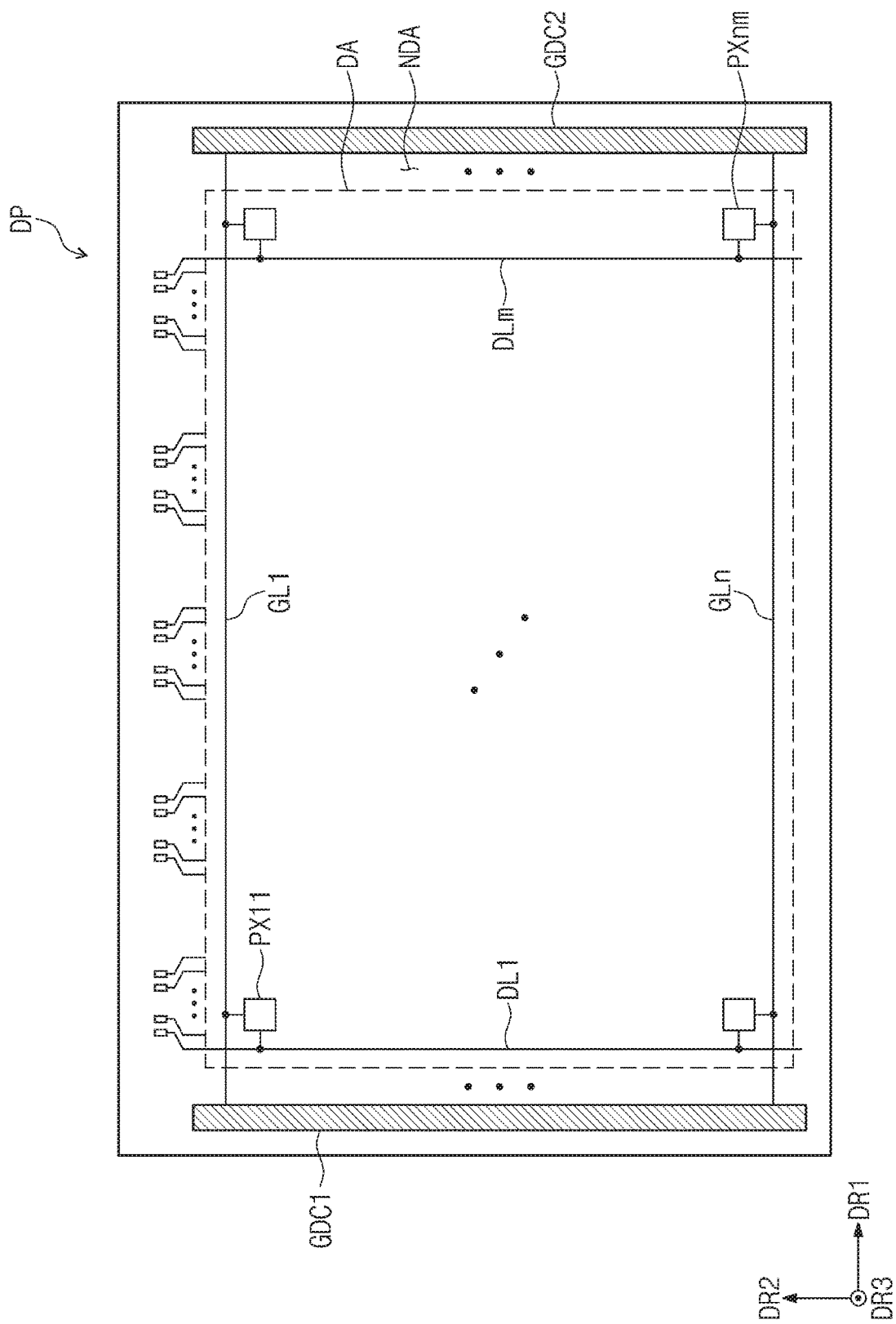
FIG. 2B is a plan view illustrating a display panel according to another embodiment of the inventive concept.
Figure 3A:
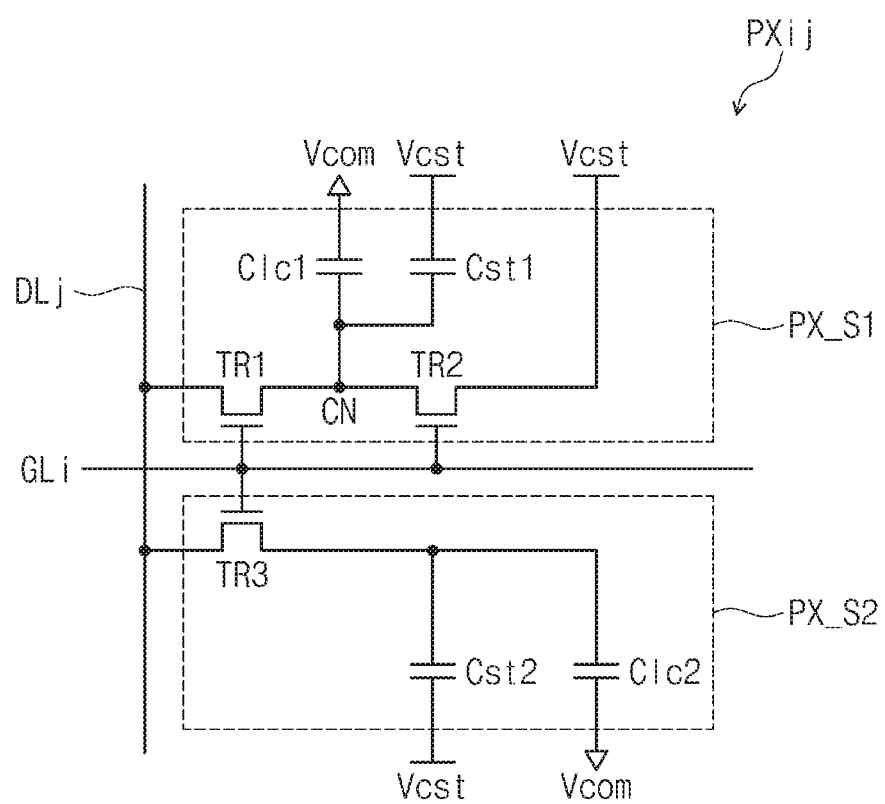
FIG. 3A is an equivalent circuit diagram of a pixel included in a display panel, according to an embodiment of the inventive concept.
Figure 3B:
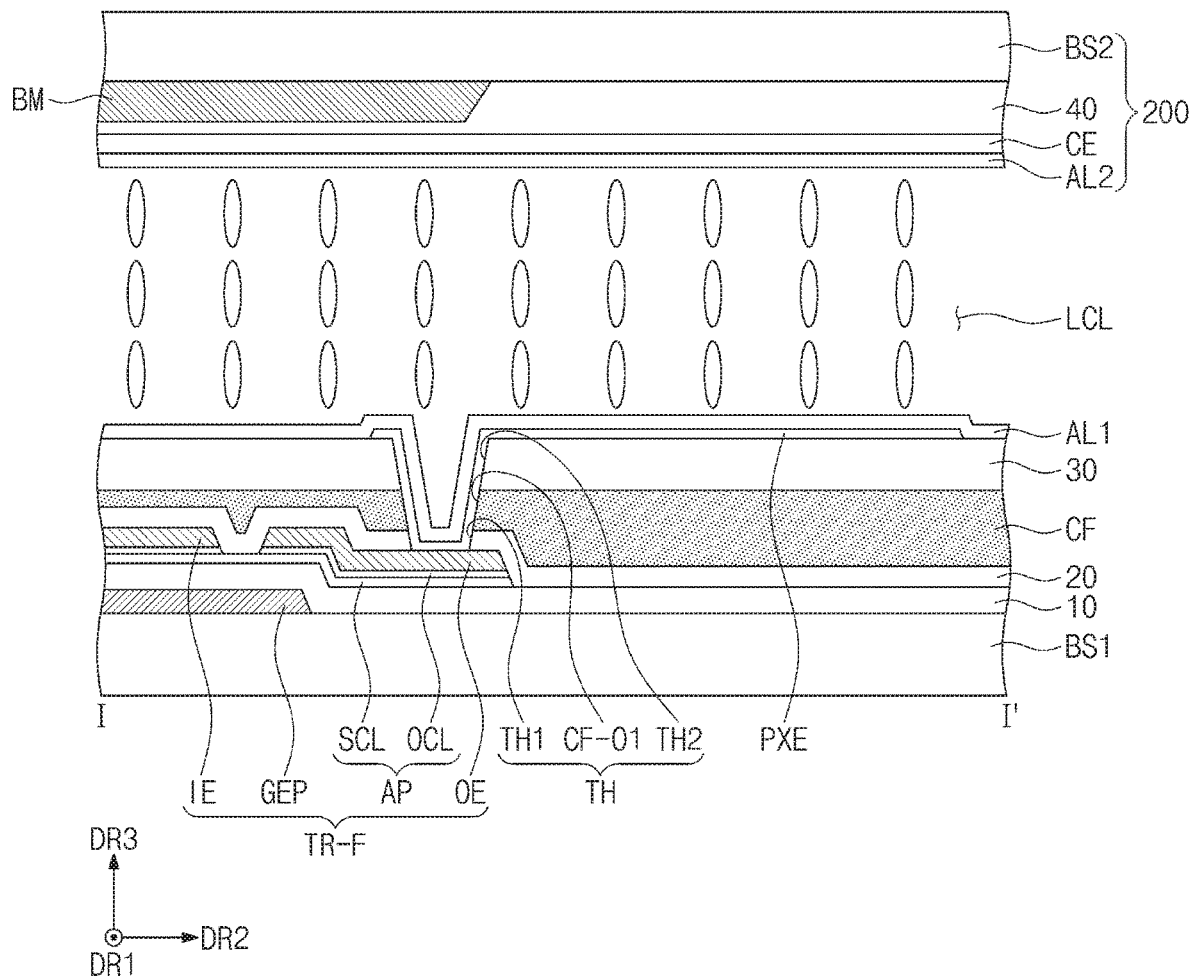
FIG. 3B is a perspective view illustrating a portion of a display panel that overlaps a display area, according to an embodiment of the inventive concept.

FIG. 2A is a plan view illustrating a display panel according to an embodiment of the inventive concept. FIG. 2B is a plan view illustrating a display panel according to another embodiment of the inventive concept. FIG. 3A is an equivalent circuit diagram of a pixel included in a display panel, according to an embodiment of the inventive concept. FIG. 3B is a perspective view illustrating a portion of a display panel that overlaps a display area, according to an embodiment of the inventive concept.

Referring to FIG. 2A, the display panel DP may include a gate driving circuit GDC1, signal lines GL1-GLn and DL1-DLm, and a plurality of pixels PX11-PXnm. In an embodiment, the signal lines GL1-GLn and DL1-DLm and the pixels PX11-PXnm may be disposed to have a planar arrangement as shown in FIG. 2A. The signal lines GL1-GLn and DL1-DLm may include a plurality of gate lines GL1-GLn and a plurality of data lines DL1-DLm. The data lines DL1-DLm are electrically disconnected from the gate lines GL1-GLn and are disposed to cross the gate lines GL1-GLn.

Each of the pixels PX11-PXnm may be connected to a corresponding one of the gate lines GL1-GLn and a corresponding one of the data lines DL1-DLm. Each of the pixels PX11-PXnm may include a pixel driving circuit and a display element. According to the structure of the pixel driving circuit, signal lines of other types may be further provided in the display panel DP.

The pixels PX11-PXnm may be arranged in a matrix shape, but the present inventive concept is not limited thereto. For example, the pixels PX11-PXnm may be arranged in a pentile shape or a diamond shape.

The gate driving circuit GDC1 may be disposed in the non-display area NDA. The gate driving circuit GDC1 may be integrated in the display panel DP through an oxide silicon gate (OSG) driver circuit process or an amorphous silicon gate (ASG) driver circuit process. The gate driving circuit GDC1 may be electrically connected to one ends of the gate lines GL1-GLn and may sequentially output a plurality of gate signals to the gate lines GL1-GLn, respectively. The gate lines GL1-GLn may deliver the gate signals to the pixels PX11-PXnm, respectively.

In addition to the gate driving circuit GDC1, as shown in FIG. 2B, a gate driving circuit GDC2 may be disposed in the non-display area NDA and may be connected to opposite ends of the gate lines GL1-GLn. In this case, two gate driving circuits GDC1 and GDC2 may be disposed at two different areas of the non-display area NDA that are opposite to each other in the first direction DR1. The two gate driving circuits GDC1 and GDC2 may output gate signals to the corresponding one of the gate lines GL1-GLn.

Referring back to FIG. 2A, ends of the data lines DL1-DLm may be connected to a data driving circuit, although it is not shown. The data driving circuit may be disposed in the non-display area NDA of the display panel DP or an external circuit board. The data lines DL1-DLm may receive respective data voltages that are output through the data driving circuit. The data lines DL1-DLm may be used to deliver the data voltages to the pixels PX11-PXnm, respectively.

In an embodiment, the display panel DP may include a plurality of data test lines (not shown) that overlaps the non-display area NDA and is electrically connected to other ends of the data lines DL1-DLm, respectively. The data test lines may be used to examine a breakage, a short, and/or a cut in the data lines DL1-DLm. In an embodiment, the data lines DL1-DLm and the data test lines may be disposed in the same layer by the same process.

In one embodiment, the data test lines may be in contact with an outer pin that is electrically connected to an external test apparatus. The outer pin may be used to examine whether there is a breakage issue in the data lines DL1-DLm. The external test apparatus may evaluate whether there is a breakage issue in the data line based on signals received from the outer pin.

As described above, the breakage of the data line may be checked by the outer pin that is in contact with each of the data test lines or with some of the data test lines. In the present embodiment, the outer pin is in contact with the data lines DL1-DLm through the data test lines, not directly contacting the data lines DL1-DLm, it may be possible to prevent a physical breakage of the data lines DL1-DLm during the test process. In comparison, if the outer pin is directly connected to the data lines DL1-DLm without any data test lines, the data lines DL1-DLM may be broken during the test process by the outer pin.

According to an embodiment of the inventive concept, the breakage of the gate lines GL1-GLn may be checked through gate test lines (hereinafter also referred to as test lines EL) that are electrically connected to the gate lines GL1-GLn. In an embodiment, the test lines and the gate lines GL1-GLn may be disposed in different layers from each other while they are electrically connected to each other. For example, the test lines and the gate lines GL1-GLn may be formed by separate processes.

As described above, the breakage of the gate line may be checked by the outer pin that is in contact with each of the test lines or with some of the test lines. Since the outer pin is in contact with the gate lines GL1-GLn through the test lines, not in a direct contact manner, it may be possible to prevent the physical breakage of the gate lines GL1-GLn caused by the outer pin. The structure of the test lines will be described in more detail with reference to FIGS. 4 to 8.

FIG. 3A illustrates an example of a pixel PXij that is connected to an i-th gate line GLi (i being an integer between 1 and n) and a j-th data line DLj (j being an integer between 1 and m). Hereinafter, a liquid crystal display panel will be described as an example of the display panel DP. FIG. 3A illustrates an equivalent circuit diagram for one pixel PXij among the pixels PX11-PXnm of FIG. 2A, and each of the pixels PX11-PXnm shown in FIG. 2A may have the same structure as the pixel PXij.

In detail, referring to FIG. 3A, the pixel PXij may include a first sub-pixel PX_S1 and a second sub-pixel PX_S2. The pixel PXij including the two sub-pixels PX_S1 and PX_S2 may have an improved oblique viewing property.

The first sub-pixel PX_S1 may include a first transistor TR1, a second transistor TR2, a first liquid crystal capacitor Clc1, and a first storage capacitor Cst1. The second sub-pixel PX_S2 may include a third transistor TR3, a second liquid crystal capacitor Clc2, and a second storage capacitor Cst2.

A control electrode of the first transistor TR1 may be connected to the i-th gate line GLi, and an input electrode of the first transistor TR1 may be connected to the data line DLj, and an output electrode of the first transistor TR1 may be connected to a connection node CN that is connected to the first liquid crystal capacitor Clc1 and the first storage capacitor Cst1.

A first electrode of the first liquid crystal capacitor Clc1 may be connected to the output electrode of the first transistor TR1 at the connection node CN, and a second electrode of the first liquid crystal capacitor Clc1 may receive a common voltage Vcom. A first electrode of the first storage capacitor Cst1 may be connected to the output electrode of the first transistor TR1 at the connection node CN, and a second electrode of the first storage capacitor Cst1 may receive a storage voltage Vcst. A control electrode of the second transistor TR2 may be connected to the i-th gate line GLi, an input electrode of the second transistor TR2 may receive a storage voltage Vcst, and an output electrode of the second transistor TR2 may be connected to the output electrode of the first transistor TR1 at the connection node CN.

A control electrode of the third transistor TR3 may be connected to the i-th gate line GLi, an input electrode of the third transistor TR3 may be connected to the data line DLj, and an output electrode of the third transistor TR3 may be connected to the second liquid crystal capacitor Clc2 and the second storage capacitor Cst2.

A first electrode of the second liquid crystal capacitor Clc2 may be connected to the output electrode of the third transistor TR3, and a second electrode of the second liquid crystal capacitor Clc2 may receive the common voltage Vcom. A first electrode of the second storage capacitor Cst2 may be connected to the output electrode of the third transistor TR3, and a second electrode of the second storage capacitor Cst2 may receive the storage voltage Vcst. The storage voltage Vcst may have substantially the same voltage level as that of the common voltage Vcom.

A gate signal that is applied to the i-th gate line GLi may turn on the first to third transistors TR1, TR2, and TR3 substantially at the same time. As a result, a data voltage of the data line DLj may be provided to the first sub-pixel PX_S1 through the turned-on first transistor TR1. In addition, the storage voltage Vcst may be provided to the first sub-pixel PX_S1 through the turned-on second transistor TR2.

A voltage (hereinafter also referred to as a distribution voltage at the connection node CN, to which the first transistor TR1 and the second transistor TR2 are connected, may be determined based on resistances of the first and second transistors TR1 and TR2, when each of the first and second transistors TR1 and TR2 is turned on. For example, the distribution voltage may have a voltage level between the data voltage that is provided through the turned-on first transistor TR1 and the storage voltage Vcst that is provided through the turned-on second transistor TR2, respectively.

Accordingly, the first liquid crystal capacitor Clc1 may be charged to a first pixel voltage that corresponds to a difference in the voltage level between the distribution voltage and the common voltage Vcom. Directions or orientations of liquid crystal molecules in a liquid crystal layer (e.g., the liquid crystal layer LCL; see FIG. 3B) corresponding to the first sub-pixel PX_S1 may be controllably changed depending on an amount of charges that is charged in the first liquid crystal capacitor Clc1. Light incident into the liquid crystal layer may be transmitted or blocked depending on the controlled directions or orientations of the liquid crystal molecules. The first storage capacitor Cst1 may be connected in parallel to the first liquid crystal capacitor Clc1, and the directions or orientations of the liquid crystal molecules may be preserved during a specific time interval using an amount of charges stored in the first storage capacitor Cst1.

The data voltage of the j-th data line DLj may be provided to the second sub-pixel PX_S2 through the turned-on third transistor TR3. The second liquid crystal capacitor Clc2 may be charged to a second pixel voltage that corresponds to a difference in the voltage level between the data voltage and the common voltage Vcom. Directions or orientations of liquid crystal molecules in the liquid crystal layer corresponding to the second sub-pixel PX_S2 may be controllably changed depending on an amount of charges that is charged in the second liquid crystal capacitor Clc2. Light incident into the liquid crystal layer may be transmitted or blocked depending on the controlled directions or orientations of the liquid crystal molecules. The second storage capacitor Cst2 may be connected in parallel to the second liquid crystal capacitor Clc2, and the directions or orientations of the liquid crystal molecules may be preserved during a specific time interval using an amount of charges stored in the second storage capacitor Cst2.

Due to the voltage distribution caused by the second transistor TR2, the first liquid crystal capacitor Clc1 may be charged to the first pixel voltage and the second liquid crystal capacitor Clc2 may be charged to the second pixel voltage that may be different from the first pixel voltage. In one embodiment, the first pixel voltage may be lower than the second pixel voltage. Due to this difference between the first and second pixel voltages, a gradation difference may occur between images displayed on the first and second sub-pixels PX_S1 and PX_S2.

As described above, an example of a pixel structure of the pixel PXij is illustrated in FIG. 3A, but the pixel structure may be variously changed without deviating from the scope of the present inventive concept. For example, two adjacent gate lines may be disposed between two sub-pixels PX_S1 and PX_S2.

A first gate line GLi may be connected to the control electrode of each of the first and second transistors TR1 and TR2 that are included in the first sub-pixel PX_S1 of FIG. 3A. In this case, the third transistor TR3 may be electrically disconnected from the first gate line GLi, and a second gate line that is adjacent to the first gate line GLi may be connected to the control electrode of the third transistor TR3 included in the second sub-pixel PX_S2.

FIG. 3B illustrates a portion of the display panel DP that overlaps the display area DA. The first display substrate 100 may include a first base layer BS1, a first insulating layer 10, an intermediate insulating layer 20, a second insulating layer 30, a pixel electrode PXE, a first alignment layer AL1, a thin film transistor TR-F, and a color filter CF. The thin film transistor TR-F may include a control electrode GEP, an input electrode IE, and an output electrode OE, and a semiconductor pattern AP. In the present specification, the input electrode IE may be referred to as a first electrode, and the output electrode OE may be referred to as a second electrode.

The control electrode GEP may be disposed on a top surface of the first base layer BS1. The control electrode GEP may be formed of or include at least one of metallic materials (e.g., aluminum (Al), silver (Ag), copper (Cu), molybdenum (Mo), chromium (Cr), tantalum (Ta), and titanium (Ti)), or an alloy thereof. The i-th gate line GLi may have a multi-layered structure including, for example, a titanium layer and a copper layer. Although not shown, a storage line that is used to deliver the storage voltage Vcst may be disposed on the top surface of the first base layer BS1. In one embodiment, the control electrode GEP and the storage line may be disposed by the same process.

The first base layer BS1 may be a glass substrate or a plastic substrate. The first insulating layer 10 may be disposed on the top surface of the first base layer BS1 to cover the control electrode GEP. The first insulating layer 10 may be formed of or include at least one of inorganic and/or organic materials. In the present embodiment, the first insulating layer 10 may be an inorganic layer. For example, the first insulating layer 10 may be formed of or include at least one of silicon nitride, silicon oxynitride, silicon oxide, titanium oxide, or aluminum oxide.

The semiconductor pattern AP may be disposed on the first insulating layer 10 to overlap at least a portion of the control electrode GEP. The semiconductor pattern AP may include a semiconductor layer SCL and an ohmic contact layer OCL. The semiconductor layer SCL may be disposed on the first insulating layer 10, and the ohmic contact layer OCL may be disposed on the semiconductor layer SCL.

The semiconductor layer SCL may be formed of or include amorphous silicon or poly silicon. In addition, the semiconductor layer SCL may be formed of or include at least one of metal oxide semiconductor materials. The ohmic contact layer OCL may be doped to have an impurity concentration higher than that of the semiconductor layer SCL. The ohmic contact layer OCL may include two portions spaced apart from each other. In an embodiment, the ohmic contact layer OCL may have a unitary body.

The input electrode IE and the output electrode OE may be disposed on the semiconductor pattern AP to overlap at least a portion of the control electrode GEP. The intermediate insulating layer 20 may be disposed on the first insulating layer 10 to cover the input electrode IE and the output electrode OE. The intermediate insulating layer 20 may be formed of or include at least one of inorganic and/or organic materials. In the present embodiment, the intermediate insulating layer 20 may be an inorganic layer. The intermediate insulating layer 20 may be formed of or include at least one of silicon nitride, silicon oxynitride, silicon oxide, titanium oxide, or aluminum oxide.

The color filter CF may be disposed on the intermediate insulating layer 20. The color filter CF may have one of red, green, and blue colors.

The second insulating layer 30 may be disposed on the color filter CF. The second insulating layer 30 may be an organic layer having a flat top surface. The second insulating layer 30 may be formed of or include an acrylic resin. Although, in the embodiment of FIG. 3B, the color filter CF is illustrated to be a part of the first display substrate 100, but the inventive concept is not limited to this example. For example, the color filter CF may be included in the second display substrate 200.

The pixel electrode PXE may be disposed on the second insulating layer 30. The pixel electrode PXE may be connected to the output electrode OE through a pixel contact hole TH that penetrates through the intermediate insulating layer 20, the color filter CF, and the second insulating layer 30. The first alignment layer AL1 may be disposed on the second insulating layer 30 to cover the pixel electrode PXE. The first alignment layer AL1 may be formed of or include a poly imide resin.

The pixel contact hole TH may include a first penetration hole TH1, a second penetration hole TH2, and a filter penetration hole CF-01. The first penetration hole TH1 may be defined in the intermediate insulating layer 20 to exposed at least a portion of the output electrode OE. The second penetration hole TH2 may be defined in the second insulating layer 30 to correspond to the first penetration hole TH1. The filter penetration hole CF-01 may be defined in the color filter CF to correspond to the second penetration hole TH2.

The second display substrate 200 may include a second base layer BS2, a third insulating layer 40, a common electrode CE, and a second alignment layer AL2.

The second base layer BS2 may be formed of or include substantially the same material (e.g., glass or plastic material) as the first base layer BS1. The third insulating layer 40 may be disposed on a bottom surface of the second base layer BS2.

The common electrode CE, to which the common voltage Vcom is applied, may be disposed on a bottom surface of the third insulating layer 40. The common voltage Vcom may be different from the pixel voltage. The second alignment layer AL2 may be disposed on a bottom surface of the common electrode CE.

A liquid crystal layer LCL may be disposed between the first display substrate 100 and the second display substrate 200. The liquid crystal layer LCL may be aligned by the first alignment layer AL1 of the first display substrate 100 and the second alignment layer AL2 of the second display substrate 200.

Meanwhile, FIG. 3B illustrates just an example of a vertical section of the pixel PXij. In other examples, the vertical positions of the first and second display substrates 100 and 200 may be changed or reversed in the third direction DR3. In addition, the display panel DP is illustrated in FIG. 3B as an example of a liquid crystal display panel of a vertical alignment (VA) mode, but in other embodiments, the inventive concept may be applied to liquid crystal display panels of an in-plane switching (IPS) mode, a fringe-field switching (FFS) mode, a plane-to-line switching (PLS) mode, etc. In the example of the IPS or PLS mode display panel, the common electrode CE included in the second display substrate 200 may be included in the first display substrate 100.

Figure 5:
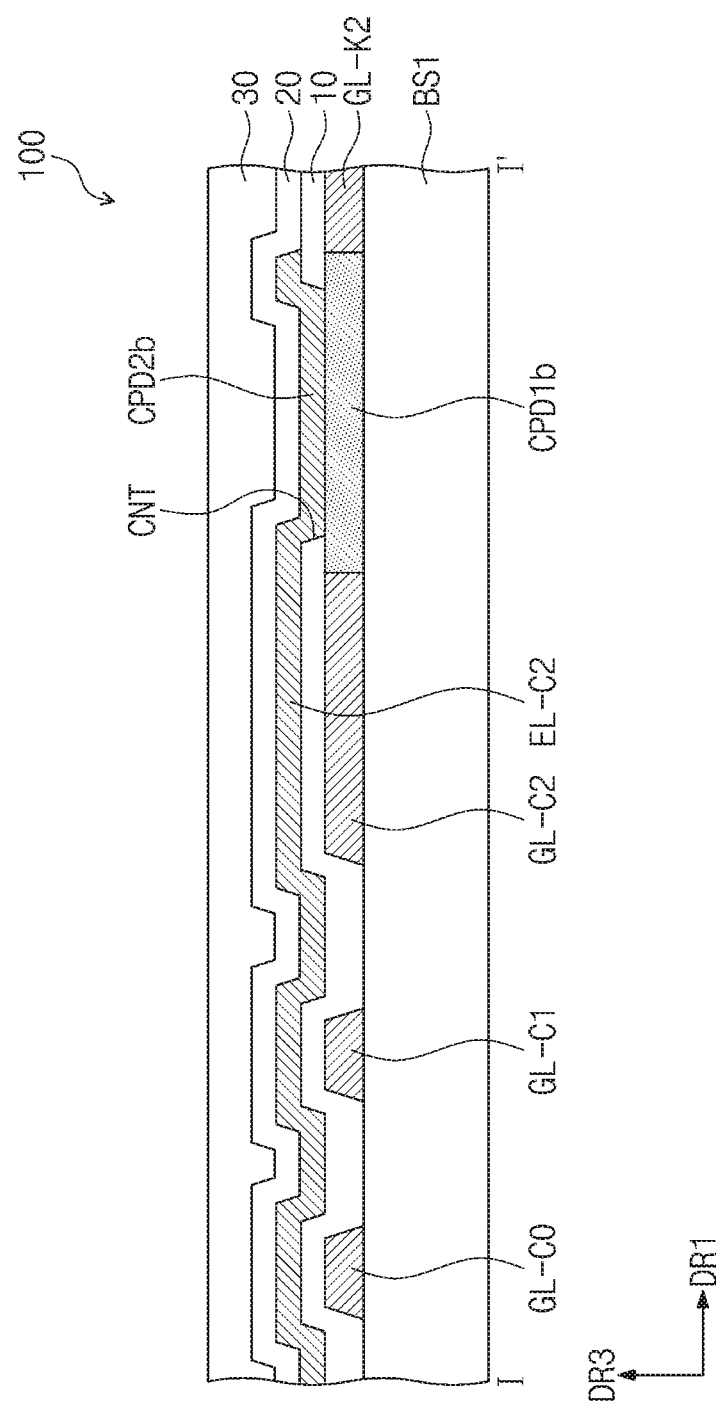
FIG. 5 is a sectional view taken along a line I-I' of FIG. 4 to illustrate a display panel according to an embodiment of the inventive concept.
Figure 6:
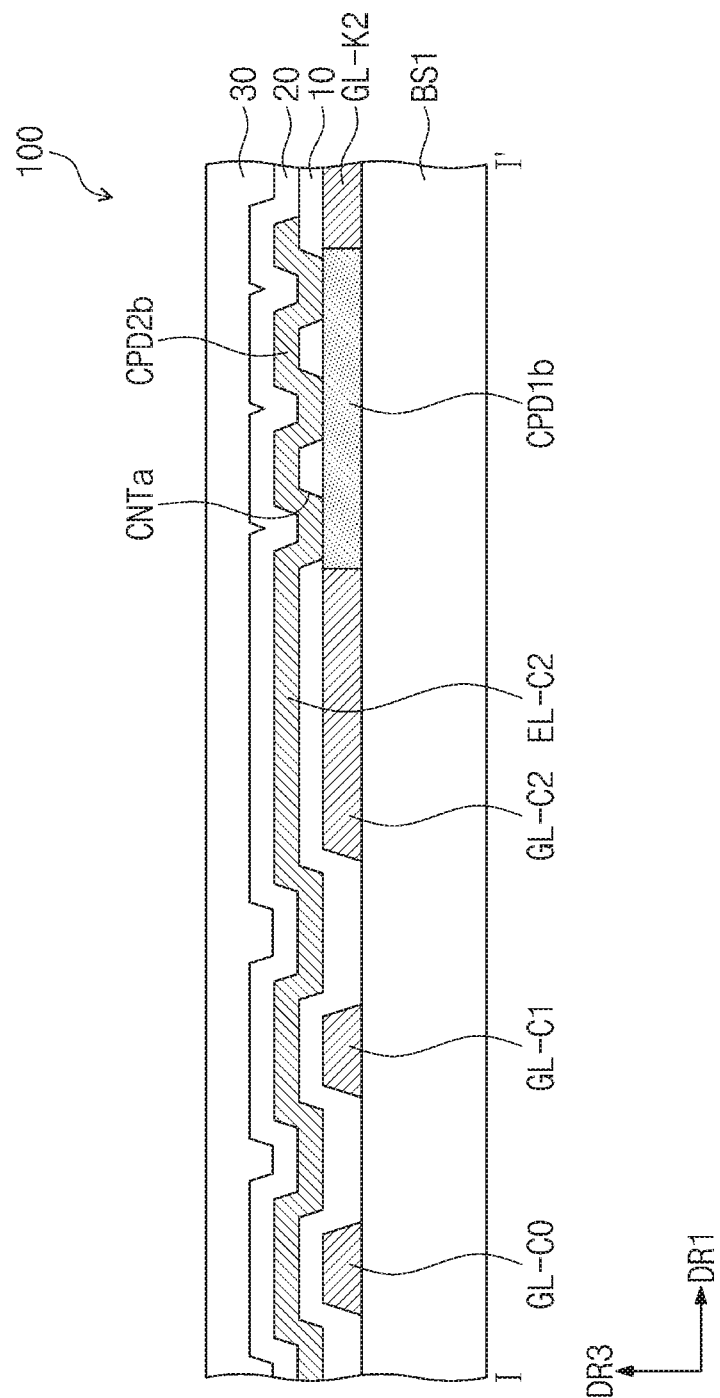
FIG. 6 is a sectional view taken along a line I-I' of FIG. 4 to illustrate a display panel according to another embodiment of the inventive concept.

FIG. 4 is a plan view illustrating a portion of a display panel that overlaps a non-display area, according to an embodiment of the inventive concept. FIG. 5 is a sectional view taken along a line I-I' of FIG. 4 to illustrate a display panel according to an embodiment of the inventive concept. FIG. 6 is a sectional view taken along a line I-I' of FIG. 4 to illustrate a display panel according to another embodiment of the inventive concept.

FIG. 4 exemplarily illustrates four gate lines that are disposed between the gate driving circuit GDC1 and the display area DA previously described with reference to FIG. 2A, and four test lines corresponding to them.

In an embodiment, each of the gate lines GL1-GLn may include a connection line portion GL-C (e.g., GL-C0, GL-C1, GL-C2, GL-C3, and GL-C4), a pad portion CPD1 (e.g., CPD1a, CPD1b, CPD1c, and CPD1d), and a line portion GL-K (e.g., GL-K1, GL-K2, GL-K3, and GL-K4). In an embodiment, the connection line portion GL-C, the pad portion CPD1, and the line portion GL-K may be formed of or include the same material. For example, the connection line portion GL-C, the pad portion CPD1, and the line portion GL-K may be formed of or include at least one of conductive (e.g., metallic) materials. In addition, the connection line portion GL-C1, the pad portion CPD1a, and the line portion GL-K1 may have a unitary body. Similarly, the connection line portion GL-C4, the pad portion CPD1d, and the line portion GL-K4 have a unitary body.

In an embodiment, the connection line portion GL-C and the pad portion CPD1 may fully overlap the non-display area NDA. By contrast, the line portion GL-K may overlap both of the non-display area NDA and the display area DA. For example, the line portion GL-K may extend from the non-display area NDA to the display area DA and may be electrically connected to a pixel in a region overlapping the display area DA.

In detail, as shown in FIG. 4, the connection line portion GL-C may include first to fourth connection line portions GL-C1, GL-C2, GL-C3, and GL-C4, each of which extends in the first direction DR1 and then extend in the second direction DR2. Ends of the first to fourth connection line portions GL-C1, GL-C2, GL-C3, and GL-C4 may be connected to the gate driving circuit GDC1 to receive gate signals from the gate driving circuit GDC1. In addition, a zeroth connection line portion GL-C0 may be further provided in an area adjacent to the first connection line portion GL-C1. The zeroth connection line portion GL-C0 may also be connected to the gate driving circuit GDC1 and a corresponding pad portion.

The pad portion CPD1 may be disposed between the connection line portion GL-C and the line portion GL-K. The pad portion CPD1 may include first to fourth pad portions CPD1a, CPD1b, CPD1c, and CPD1d. The first to fourth pad portions CPD1a, CPD1b, CPD1c, and CPD1d may be electrically connected to opposite ends of the first to fourth connection line portions GL-C1, GL-C2, GL-C3, and GL-C4, respectively. In the embodiment of FIG. 4, each of the first to fourth pad portions CPD1a, CPD1b, CPD1c, and CPD1d may have a rectangular or square shape in a plan view. However, the inventive concept is not limited to the present example, and the shapes of the first to fourth pad portions CPD1a, CPD1b, CPD1c, and CPD1d may be variously changed without deviating from the scope of the present inventive concept.

According to an embodiment of the inventive concept, each of the first to fourth pad portions CPD1a, CPD1b, CPD1c, and CPD1d may have an area larger than the corresponding one of the first to fourth connection line portions GL-C1, GL-C2, GL-C3, and GL-C4, within a specific region having the same length in the first direction DR1 and/or the second direction DR2. For example, the connection line portion GL-C and the line portion GL-K may have a line shape extending in at least one direction, whereas the pad portion may have a rectangular or square shape.

The line portion GL-K may include first to fourth line portions GL-K1, GL-K2, GL-K3, and GL-K4 that extend in the first direction DR1 and are arranged in the second direction DR2. Ends of the first to fourth line portions GL-K1, GL-K2, GL-K3, and GL-K4 may overlap the non-display area NDA and may be electrically connected to the first to fourth pad portions CPD1a, CPD1b, CPD1c, and CPD1d, respectively. Furthermore, each of the first to fourth line portions GL-K1, GL-K2, GL-K3, and GL-K4 may be connected to a corresponding one of the pixels PX11-PXnm in the display area DA.

According to the afore-described embodiment, the connection line portion GL-C, the pad portion CPD1, and the line portion GL-K may be electrically connected to each other and may be used to deliver the gate signals from the gate driving circuit GDC1 to the pixels PX11-PXnm.

A plurality of test lines EL, each including a test line portion EL-C (e.g., EL-C1, EL-C2, EL-C3, and EL-C4) and a test pad portion CPD2 (e.g., CPD2a, CPD2b, CPD2c, and CPD2d) may be disposed in a layer that is different from that under the gate lines GL1-GLn, and may be electrically and respectively connected to the gate lines GL1-GLn. In an embodiment, the test lines EL may be used to examine a breakage in the gate lines GL1-GLn, and may be provided to have a one-to-one correspondence with the gate lines GL1-GLn.

Each of the test lines EL may include a test line portion EL-C and a test pad portion CPD2 that may be disposed on the same layer. Meanwhile, for convenience in description, the test line portion EL-C is illustrated in FIG. 4 to includes first to fourth test line portions EL-C1, EL-C2, EL-C3, and EL-C4 that are electrically and respectively connected to the first to fourth connection line portions GL-C1, GL-C2, GL-C3, and GL-C4.

When viewed in a plan view, the first to fourth test line portions EL-C1, EL-C2, EL-C3, and EL-C4 may be disposed between the gate driving circuit GDC1 and the test pad portion CPD2, may extend in the first direction DR1, and may be arranged in the second direction DR2.

In an embodiment, at least one of the first to fourth test line portions EL-C1, EL-C2, EL-C3, and EL-C4 may partially overlap at least one of the first to fourth connection line portions GL-C1, GL-C2, GL-C3, and GL-C4. For example, the first test line portion EL-C1 may overlap a portion of the zeroth connection line portion GL-C0 and a portion of first connection line portion GL-C1.

The test pad portion CPD2 may include first to fourth test pad portions CPD2a, CPD2b, CPD2c, and CPD2d that are electrically and respectively connected to the first to fourth test line portions EL-C1, EL-C2, EL-C3, and EL-C4. Ends of the first to fourth test line portions EL-C1, EL-C2, EL-C3, and EL-C4 may be electrically and respectively connected to the first to fourth test pad portions CPD2a, CPD2b, CPD2c, and CPD2d.

In an embodiment, each of the first to fourth test pad portions CPD2a, CPD2b, CPD2c, and CPD2d may have an area larger than a corresponding one of the first to fourth test line portions EL-C1, EL-C2, EL-C3, and EL-C4, within a specific area having the same length in the first direction DR1 and/or the second direction DR2.

Furthermore, the first to fourth test pad portions CPD2a, CPD2b, CPD2c, and CPD2d may respectively overlap the first to fourth pad portions CPD1a, CPD1b, CPD1c, and CPD1d. In an embodiment, the first to fourth test pad portions CPD2a, CPD2b, CPD2c, and CPD2d may be in electric contact with the first to fourth pad portions CPD1a, CPD1b, CPD1c, and CPD1d, respectively, through corresponding contact holes CNT that penetrates through the first insulating layer 10. A plurality of contact holes CNT may be provided to have a one-to-one correspondence with the gate lines GL1-GLn.

As described above, a gate line GL (e.g., GL1-GLn) and a corresponding test line EL may be disposed on layers different from each other but may be in electric contact with each other through the contact hole CNT. In other words, an end of the test line may be electrically connected to the gate line through the contact hole CNT, and an opposite end of the test line may be connected to a ground terminal (not shown).

In addition, a breakage of the gate line may be checked through the afore-described outer pin that is in contact with the gate line through the test line. Thus, even if the test line is physically broken by the outer pin during the test process, it may be possible to prevent the gate line from being broken.

FIG. 5 exemplarily illustrates the second test line portion EL-C2, the second connection line portion GL-C2, the second test pad portion CPD2b, the second pad portion CPD1b, and the second line portion GL-K2 described with reference to FIG. 4.

The second connection line portion GL-C2, the second pad portion CPD1b, and the second line portion GL-K2 may be disposed on the first base layer BS1. The other connection line portions GL-C0, GL-C1, GL-C3, and GL-C4 and the other pad portions CPD1a, CPD1c, and CPD1d may also be disposed on the first base layer BS1. The first insulating layer 10 may be disposed on the first base layer BS1 to cover the second connection line portion GL-C2, the second pad portion CPD1b, and the second line portion GL-K2.

In an embodiment, the connection line portion GL-C, the pad portion CPD1, and the line portion GL-K may be formed on the first base layer BS1 by the same process as that for the control electrode GEP of the thin film transistor TR-F shown in FIG. 3B.

The second test line portion EL-C2 and the second test pad portion CPD2b may be disposed on the first insulating layer 10. In an embodiment, the second test pad portion CPD2b may be in electric contact with the second pad portion CPD1b through the contact hole CNT defined in the first insulating layer 10. Accordingly, the gate signals that are output from the gate driving circuit GDC1 may be provided to the second test pad portion CPD2b and the second test line portion EL-C2 through the second pad portion CPD1b.

In an embodiment, the test line portion EL-C and the test pad portion CPD2 may be formed on the first insulating layer 10 by the same process as that for the input and output electrodes IE and OE shown in FIG. 3B.

The intermediate insulating layer 20 may be disposed on the first insulating layer 10 to cover the second test pad portion CPD2b and the second test line portion EL-C2. The second insulating layer 30 may be disposed on the intermediate insulating layer 20.

Referring to FIG. 6, the first insulating layer 10 may include a plurality of sub-contact holes CNTa defined therein whereas the first insulating layer 10 illustrated in FIG. 5 includes one contact hole CNT defined therein. The second test pad portion CPD2b may be in electric contact with the second pad portion CPD1b through the sub-contact holes CNTa defined in the first insulating layer 10.

Figure 7:
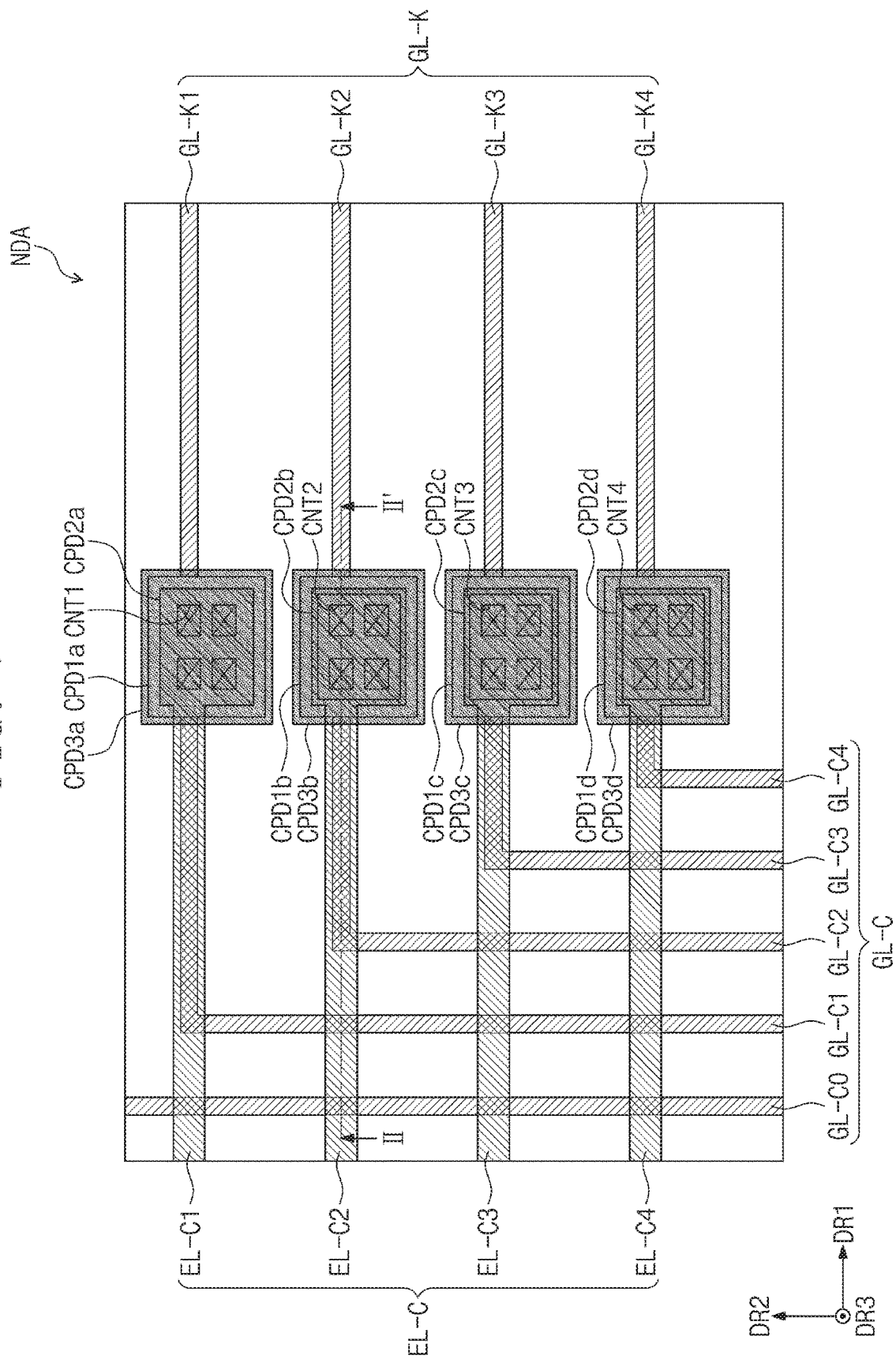
FIG. 7 is a plan view illustrating a portion of a display panel that overlaps a non-display area, according to another embodiment of the inventive concept.
Figure 8:
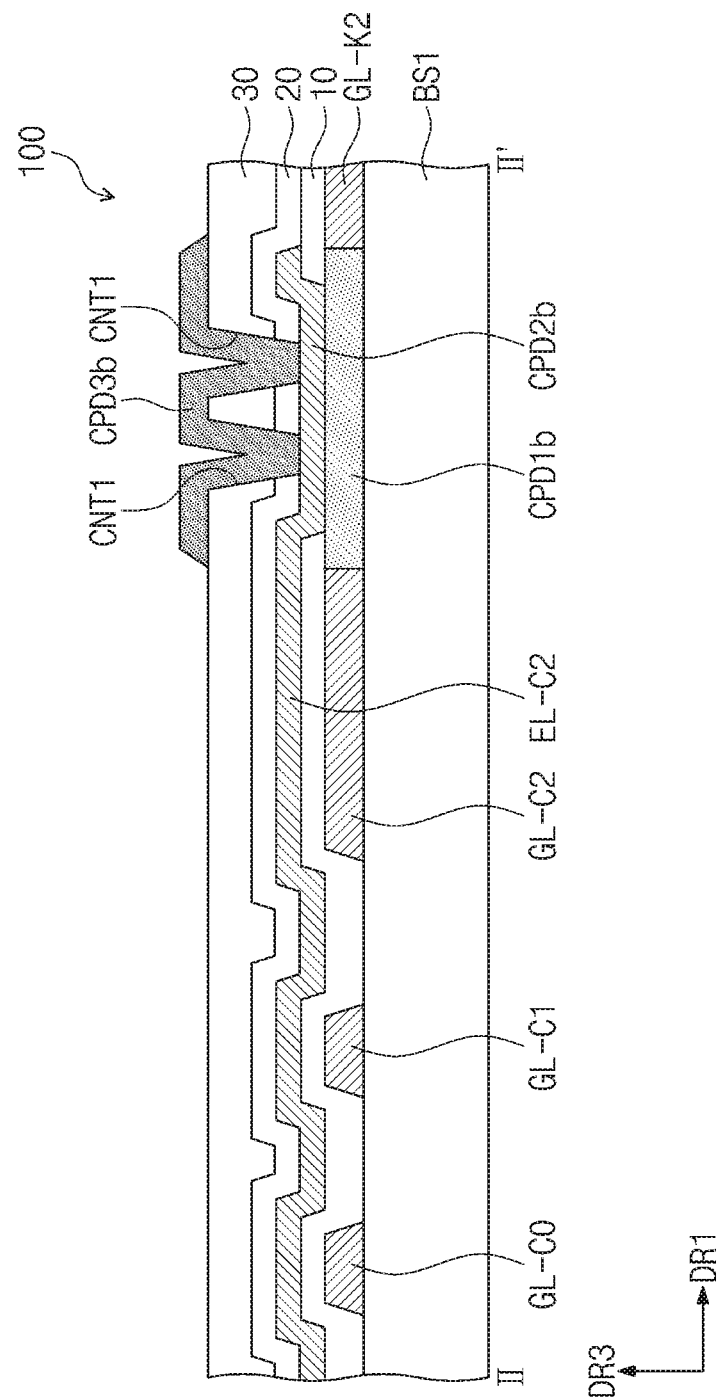
FIG. 8 is a sectional view taken along a line II-II' of FIG. 7 to illustrate a display panel according to another embodiment of the inventive concept.

FIG. 7 is a plan view illustrating a portion of a display panel that overlaps a non-display area, according to another embodiment of the inventive concept. FIG. 8 is a sectional view taken along a line II-IT of FIG. 7 to illustrate a display panel according to another embodiment of the inventive concept.

Referring to FIG. 7, the first display substrate 100 may further include auxiliary test pad portions CPD3a, CPD3b, CPD3c, and CPD3d (hereinafter collectively referred to as an auxiliary test pad portion CPD3), when compared with the first display substrate 100 shown in FIG. 6. The auxiliary test pad portion CPD3 may be in electric contact with the test pad portion CPD2, and may be used to examine a breakage in the gate lines GL1-GLn that provide the gate signals to the pixels PX11-PXnm.

The auxiliary test pad portion CPD3 may include first to fourth auxiliary test pad portions CPD3a, CPD3b, CPD3c, and CPD3d that are in electric contact with the first to fourth test pad portions CPD2a, CPD2b, CPD2c, and CPD2d, respectively. The first to fourth auxiliary test pad portions CPD3a, CPD3b, CPD3c, and CPD3d may have a rectangular or square shape and may overlap the first to fourth test pad portions CPD2a, CPD2b, CPD2c, and CPD2d, respectively.

In the embodiment of FIG. 7, the auxiliary test pad portion CPD3 is illustrated to be in electric contact with the test pad portion CPD2 through four sub-contact holes CNT1, but the number of the sub-contact holes CNT1 may be variously changed without deviating from the scope of the present inventive concept.

In particular, the first to fourth auxiliary test pad portions CPD3a, CPD3b, CPD3c, and CPD3d may be disposed on the second insulating layer 30 as shown in FIGS. 7 and 8. The first to fourth auxiliary test pad portions CPD3a, CPD3b, CPD3c, and CPD3d may be in electric contact with the first to fourth test pad portions CPD2a, CPD2b, CPD2c, and CPD2d, respectively, through the sub-contact holes CNT1 that penetrate through the intermediate insulating layer 20 and the second insulating layer 30.

Furthermore, the first to fourth auxiliary test pad portions CPD3a, CPD3b, CPD3c, and CPD3d may be formed on the second insulating layer 30 using the same material and the same process as the pixel electrode PXE of FIG. 3B.

In the embodiment of FIGS. 7 and 8, after the process for forming the first display substrate 100 is finished, it may be difficult to check a breakage of the gate line through the test line portion EL-C and the test pad portion CPD2. It is because an outer pin (not shown) may not be in contact with the test line portion EL-C and the test pad portion CPD2, due to the intermediate insulating layer 20 and the second insulating layer 30 disposed on the test line portion EL-C and the test pad portion CPD2.

According to the embodiment shown in FIGS. 7 and 8, the second auxiliary test pad portion CPD3b may be in electric contact with the second test pad portion CPD2b through one or more sub-contact holes CNT1 that penetrate through the intermediate insulating layer 20 and the second insulating layer 30. Thus, even after the process for forming the first display substrate 100 is finished, it may be possible to check a breakage in the gate line through the second auxiliary test pad portion CPD3b that is electrically connected to the second pad portion CPD1b and the second test pad portion CPD2b through the one or more sub-contact holes CNT1.

FIGS. 9A, 9B, 9C, 9D, and 9E are sectional views illustrating a method of fabricating a display panel, according to an embodiment of the inventive concept. Specifically, FIGS. 9A, 9B, 9C, 9D, and 9E illustrate a method of forming the first display substrate 100 included in the display panel DP.

Referring to FIGS. 3B and 9A, the first base layer BS1 may be provided. The display area DA and the non-display area NDA are defined in the first base layer BS1. Thereafter, the pad portion CPD1 of a gate line GLi (i being an integer between 1 and n) and the control electrode GEP of the thin film transistor TR-F may be formed on the first base layer BS1 through the same process. The connection line portion GL-C and the line portion GL-K of the gate line GLn shown in FIG. 4 may also be formed on the first base layer BS1 through the same process as that for the control electrode GEP. The control electrode GEP may be formed on the first base layer BS1 to overlap the display area DA, and the pad portion CPD1 may be formed on the first base layer BS1 to overlap the non-display area NDA.

Referring to FIG. 9B, the first insulating layer 10 may be formed on the first base layer BS1 to cover the pad portion CPD1 and the control electrode GEP. Next, the first insulating layer 10 may be etched to expose at least a portion of the pad portion CPD1. As a result, a contact hole CNTg exposing the pad portion CPD1 may be defined in the first insulating layer 10.

Figure 9C:
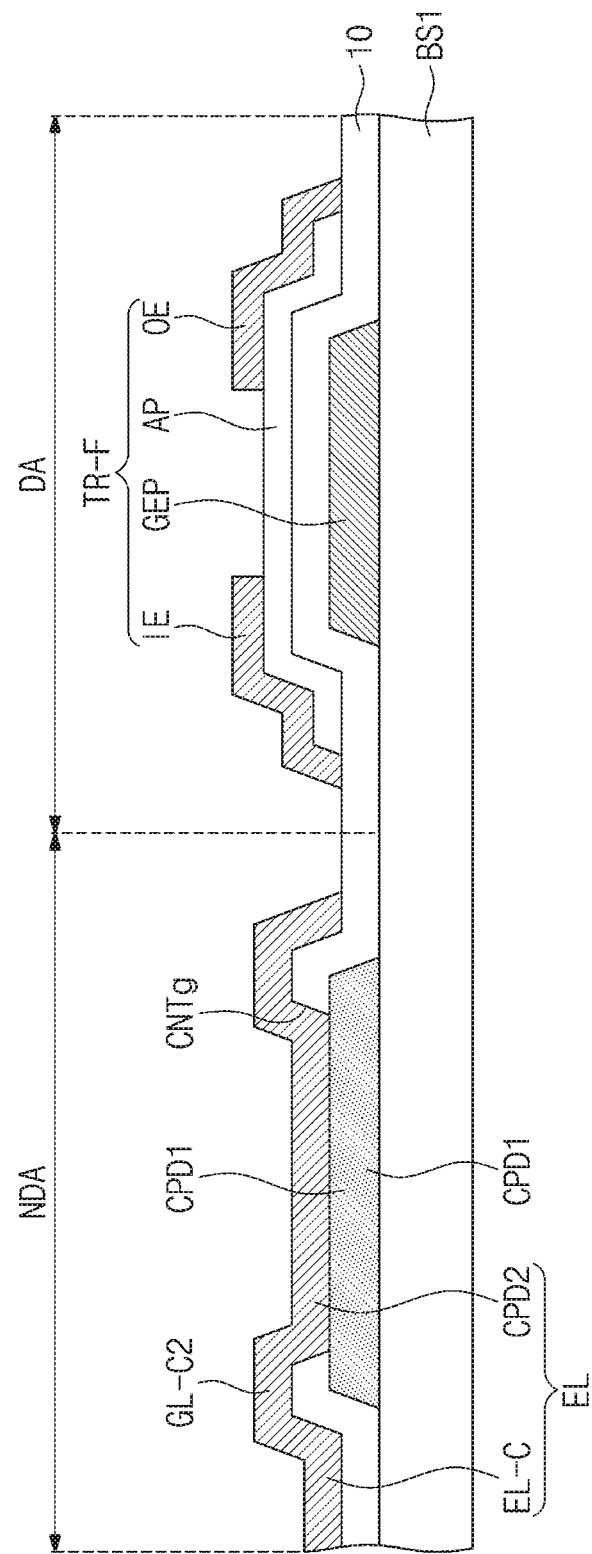

Referring to FIG. 9C, the semiconductor pattern AP may be formed on the first insulating layer 10 to overlap the control electrode GEP. Next, a test line EL that includes the test line portion EL-C and the test pad portion CPD2, and the input electrode IE and the output electrode OE of the thin film transistor TR-F may be formed on the first insulating layer 10 through the same process. The input electrode IE and the output electrode OE may be electrically connected to the control electrode GEP.

The input electrode IE and the output electrode OE may be formed to overlap the display area DA and to be spaced apart from each other on the semiconductor pattern AP. The test line EL may be formed to overlap the non-display area NDA and to be in electric contact with the pad portion CPD1 through the contact hole CNTg defined in the first insulating layer 10. As a result, the test pad portion CPD2 of the test line EL may be in electric contact with the pad portion CPD1.

Figure 9D:
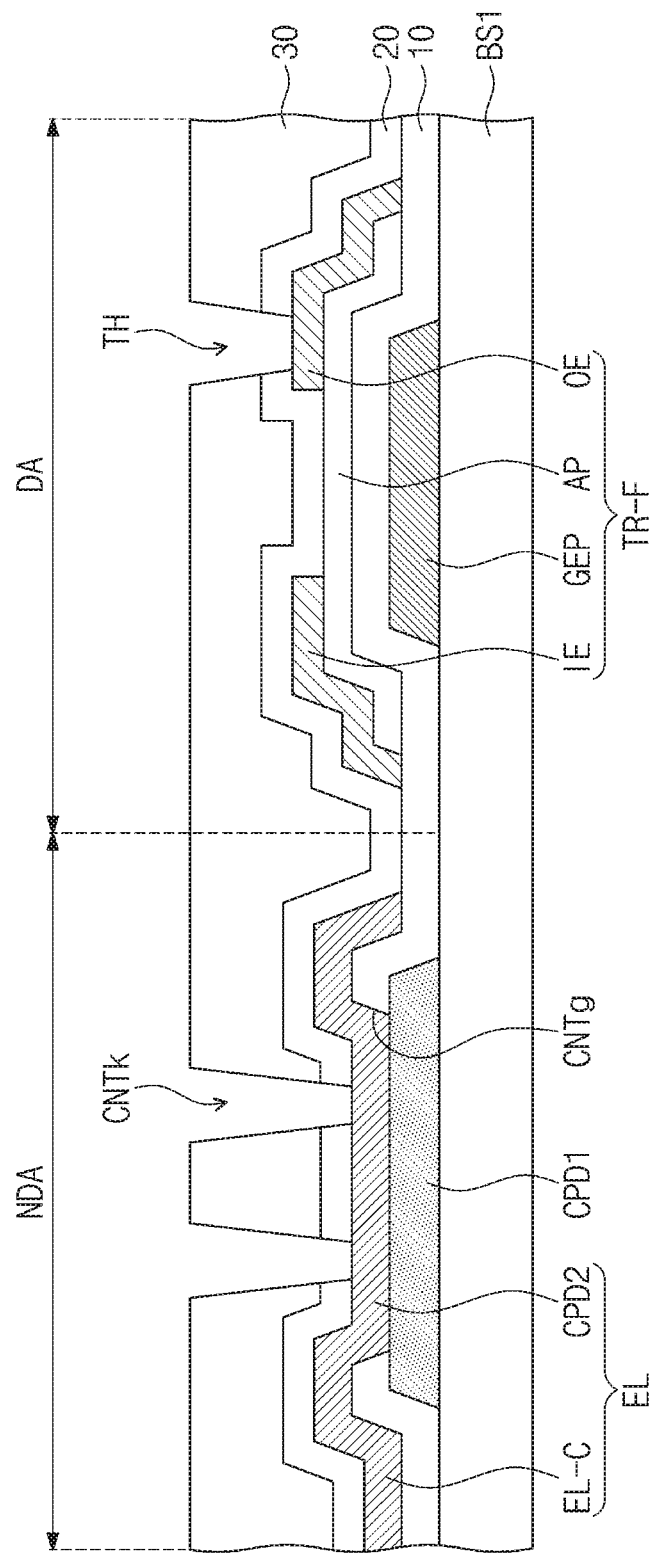

Referring to FIG. 9D, the intermediate insulating layer 20 may be formed on the first insulating layer 10 to cover the input electrode IE, the output electrode OE, the semiconductor pattern AP, and the test line EL. Thereafter, the second insulating layer 30 may be formed on the intermediate insulating layer 20. The first insulating layer 10 and the intermediate insulating layer 20 may be formed of or include at least one of inorganic materials, and the second insulating layer 30 may be formed of or include an organic material and may have a flat top surface.

Next, as shown in FIG. 9D, an etching process may be performed to form penetration holes in the intermediate insulating layer 20 and the second insulating layer 30.

In an embodiment, a contact hole CNTk may be formed to penetrate through the intermediate insulating layer 20 and the second insulating layer 30 in the non-display area NDA. The contact hole CNTk may expose a portion of the test pad portion CPD2. In addition, a pixel contact hole TH may be formed to penetrate through the intermediate insulating layer 20 and the second insulating layer 30 in the display area DA. The pixel contact hole TH may expose a portion of the output electrode OE.

Figure 9E:
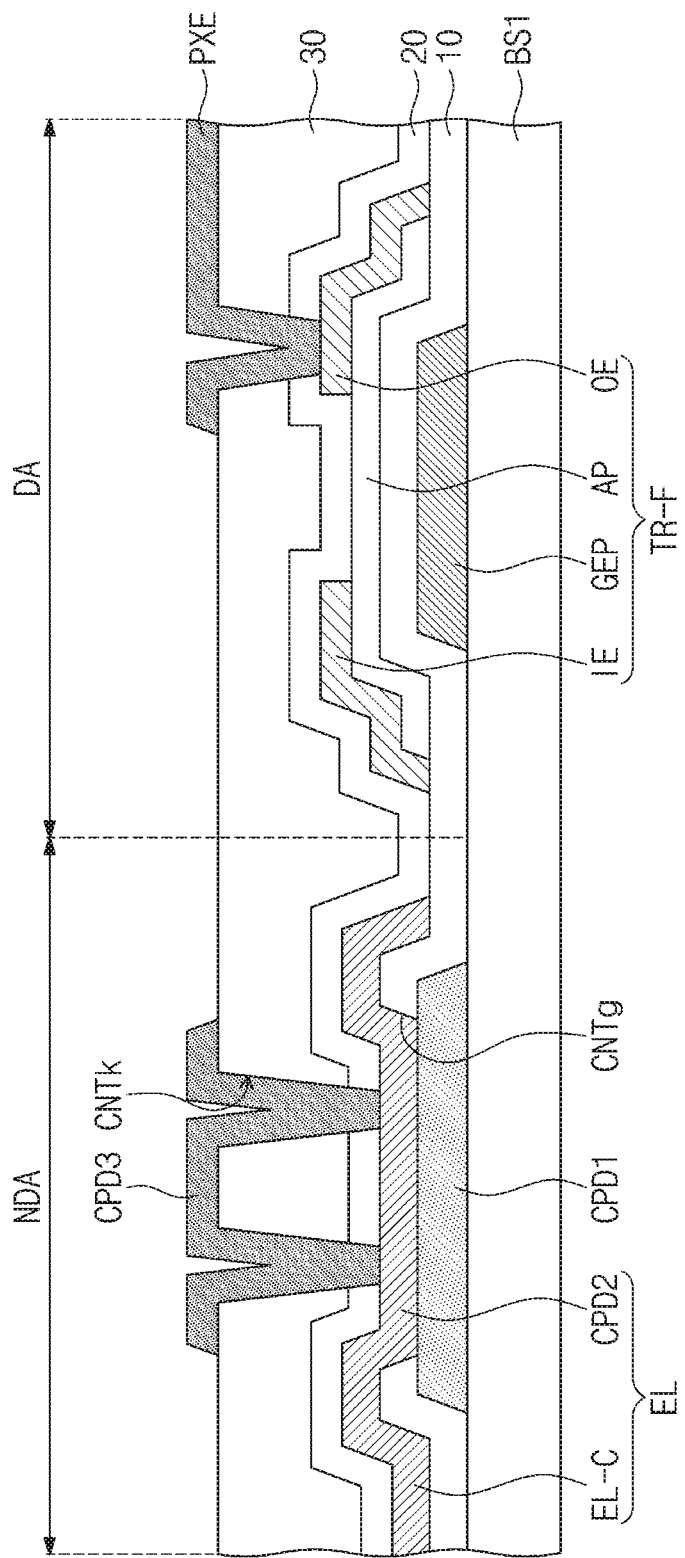

Referring to FIG. 9E, the auxiliary test pad portion CPD3 and the pixel electrode PXE may be formed on the second insulating layer 30 through the same process. In an embodiment, the auxiliary test pad portion CPD3 may overlap the non-display area NDA and may be in electric contact with the test pad portion CPD2 through the contact hole CNTk. The pixel electrode PXE may be in electric contact with the output electrode OE through the pixel contact hole TH. In an embodiment, the auxiliary test pad portion CPD3 and the pixel electrode PXE may be formed of or include a transparent conductive material (e.g., indium tin oxide (ITO)).

Thereafter, although not shown, the second display substrate 200 may be coupled to the first display substrate 100 using the adhesive member SLM (e.g., see FIG. 1B). Next, the liquid crystal layer LCL (e.g., see FIG. 3B) may be formed between the first and second display substrates 100 and 200.

Furthermore, although not shown, in an embodiment, the common electrode CE of FIG. 3B may be formed in one of the first and second display substrates 100 and 200. As an example, in the embodiment illustrated in FIG. 3B, the common electrode CE is disposed in the second display substrate 200, and the display panel DP may operate as a VA-mode liquid crystal display panel. As another example, in the case where the common electrode CE is disposed in the first display substrate 100, the display panel DP may be operated as an IPS- or PLS-mode liquid crystal display panel.

In FIG. 3B, the color filter CF is illustrated to be a part of the first display substrate 100, but the inventive concept is not limited to this example. In another embodiment, the color filter CF may be formed in the second display substrate 200.

According to an embodiment of the inventive concept, gate lines and test lines may be disposed on different layers, but they may be electrically connected to each other. An outer pin may be provided to be in electrical contact with each of the test lines, and this can prevent the gate line from being broken.

According to the afore-described structure, since the outer pin is connected to the gate lines through the test lines, not in a direct contact manner, it may be possible to prevent a physical breakage of the gate lines that may be caused by the outer pin.

While several example embodiments of the inventive concept have been particularly shown and described, it will be understood by one of ordinary skill in the art that variations in form and detail may be made therein without departing from the spirit and scope of the present inventive concepts.

What is claimed is:

1. A display panel, comprising
a first display substrate,
wherein the first display substrate comprises:
a base layer defining a display area and a non-display area that is adjacent to the display area;
a gate line disposed on the base layer, wherein the gate line comprises a line portion extending in a specific direction and a pad portion disposed on the same layer as the line portion; the pad portion continuously and physically connected to the line portion in the same layer;
a first insulating layer disposed on the base layer and covering the gate line; and
a test line overlapping the non-display area and disposed above the first insulating layer, wherein the test line covers a first contact hole defined in the first insulating layer and electrically contacts the pad portion of the gate line through the first contact hole.

2. The display panel of claim 1, wherein the gate line comprises a connection line portion disposed on the base layer and is extended in the specific direction, and the pad portion that is disposed between the connection line portion and the line portion,
wherein the connection line portion and the pad portion overlap the non-display area, and
wherein the line portion overlaps the display area and the non-display area.

3. The display panel of claim 2, wherein the pad portion has an area larger than each of the connection line portion and the line portion within a specific area having a same length in the specific direction and in another direction perpendicular to the specific direction.

4. The display panel of claim 2, wherein the connection line portion, the pad portion, and the line portion are disposed on the base layer and have a unitary body.

5. The display panel of claim 2, wherein the test line comprises a test line portion and a test pad portion that are electrically connected to each other, and
wherein the test pad portion overlaps the pad portion and is in electric contact with the pad portion through the first contact hole.

6. The display panel of claim 5, wherein the first contact hole comprises a plurality of first sub-contact holes spaced apart from each other in a plan view, and
wherein the test pad portion is in electric contact with the pad portion through the plurality of first sub-contact holes.

7. The display panel of claim 5, wherein the first display substrate further comprises:
a second insulating layer disposed on the first insulating layer and covering the test line; and
an auxiliary test pad portion disposed on the second insulating layer and being in electric contact with the test pad portion through a second contact hole defined in the second insulating layer.

8. The display panel of claim 7, wherein the second contact hole comprises a plurality of second sub-contact holes spaced apart from each other in a plan view, and
wherein the auxiliary test pad portion is in electric contact with the auxiliary test pad portion through the plurality of second sub-contact holes.

9. The display panel of claim 7, wherein the first display substrate further comprises at least one intermediate insulating layer disposed between the first insulating layer and the second insulating layer.

10. The display panel of claim 7, further comprising a second display substrate facing the first display substrate and a liquid crystal layer that is disposed between the first display substrate and the second display substrate,
wherein the first display substrate further comprises a pixel electrode that overlaps the display area and is disposed on the second insulating layer through a same process as that for the auxiliary test pad portion.

11. The display panel of claim 10, wherein one of the first display substrate and the second display substrate further comprises a common electrode.

12. The display panel of claim 5, wherein the test pad portion and the test line portion are disposed on the first insulating layer and have a unitary body, and
wherein the test pad portion has an area larger than the test line portion within a specific area having a same length in the specific direction and in another direction perpendicular to the specific direction.

13. The display panel of claim 1, wherein the gate line is provided as a plurality of gate lines,
wherein the test line is provided as a plurality of test lines corresponding to the plurality of gate lines, respectively, and
a first test line among the plurality of the test lines partially overlaps at least one of the plurality of gate lines.

14. The display panel of claim 1, wherein the first display substrate further comprises a thin film transistor that overlaps the display area and is disposed on the base layer, and
wherein the thin film transistor comprises:
a control electrode disposed on the base layer through a first process that is same as that for the gate line; and
a first electrode and a second electrode disposed on the first insulating layer through a second process that is same as that for the test line.

15. The display panel of claim 1, wherein an end of the test line is electrically connected to the gate line, and an opposite end of the test line is grounded.

16. A method of fabricating of a display panel, comprising:
forming a gate line on a first base layer, the gate line including a line portion that extends in a specific direction and a pad portion disposed on the same layer as the line portion; the pad portion is continuously and physically connected to the line portion in the same layer;
forming a first insulating layer on the first base layer to cover the gate line;
etching a portion of the first insulating layer to form a first contact hole exposing at least a portion of the pad portion of the gate line;
forming a test line above the first insulating layer, the test line covering the first contact hole and electrically contacting the pad portion of the gate line through the first contact hole; and
coupling a second base layer to the first base layer using an adhesive member.

17. The method of claim 16, further comprising:
forming a control electrode on an area of the first base layer that overlaps a display area, through a first process that is same as that for the gate line; and
forming a first electrode and a second electrode that overlap the display, on the first insulating layer through a second process that is same as that for the test line.

18. The method of claim 17, further comprising:
forming a second insulating layer on the first insulating layer to cover the test line;
forming a second contact hole and a pixel contact hole in the second insulating layer, the second contact hole overlapping a test pad portion, and the pixel contact hole overlapping the second electrode; and
forming an auxiliary test pad portion and a pixel electrode on the second insulating layer,
wherein the auxiliary test pad portion is in electric contact with the test pad portion through the second contact hole, and
wherein the pixel electrode is in electric contact with the second electrode through the pixel contact hole.

19. The method of claim 16, wherein the gate line comprises a connection line portion, a pad portion, and a line portion that are sequentially arranged,
wherein the test line comprises a test line portion and a test pad portion that is in electric contact with the pad portion through the first contact hole,
wherein the pad portion has an area larger than each of the connection line portion and the line portion within a first region occupied by the pad portion, and
wherein the test pad portion has an area larger than the test line portion within a second region occupied by the test pad portion.

20. A display panel, comprising:
a base layer defining a display area and a non-display area that is adjacent to the display area;
a signal line disposed on the base layer, the signal line comprising a connection line portion and a line portion, each of which is extended in a specific direction, and a pad portion that is disposed between the connection line portion and the line portion;
an insulating layer disposed on the base layer and covering the signal line; and
a test line overlapping the non-display area, being disposed on the insulating layer, and covering at least one contact hole defined in the insulating layer electrically contacting the pad portion of the signal line through the at least one contact hole,
wherein the connection line portion, the line portion, and pad portion are disposed on the same layer as one another, wherein the test line comprises a test line portion which is extended in the specific direction and a test pad portion that is physically connected to the test line portion, wherein the test pad portion overlaps the pad portion in a plan view.

* * * * *